United States Patent
Hieda

(10) Patent No.: US 9,053,733 B2
(45) Date of Patent: Jun. 9, 2015

(54) MAGNETIC RECORDING MEDIUM WITH MAGNETIC PORTIONS OF DIFFERENT ORIENTATIONS AND METHOD OF MANUFACTURING THE SAME

(71) Applicant: Kabushiki Kaisha Toshiba, Tokyo (JP)

(72) Inventor: Hiroyuki Hieda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 144 days.

(21) Appl. No.: 13/863,119

(22) Filed: Apr. 15, 2013

(65) Prior Publication Data

US 2013/0230742 A1    Sep. 5, 2013

Related U.S. Application Data

(62) Division of application No. 13/064,463, filed on Mar. 25, 2011, now abandoned.

(30) Foreign Application Priority Data

Apr. 14, 2010   (JP) .................................. 2010-093336

(51) Int. Cl.

| G11B 5/66 | (2006.01) |
| G11B 5/70 | (2006.01) |
| B82Y 10/00 | (2011.01) |
| G11B 5/596 | (2006.01) |
| G11B 5/74 | (2006.01) |

(Continued)

(52) U.S. Cl.
CPC .. *G11B 5/70* (2013.01); *G11B 5/66* (2013.01); *B82Y 10/00* (2013.01); *G11B 5/59655* (2013.01); *G11B 5/743* (2013.01); *G11B 5/82* (2013.01); *G11B 5/855* (2013.01)

(58) Field of Classification Search
None
See application file for complete search history.

(56) References Cited

U.S. PATENT DOCUMENTS

| 4,052,711 A | 10/1977 | Lin et al. |
| 5,317,468 A | 5/1994 | Wakabayashi et al. |

(Continued)

FOREIGN PATENT DOCUMENTS

| JP | 55-157129 | 12/1980 |
| JP | 62-202303 | 9/1987 |

(Continued)

OTHER PUBLICATIONS

New, R.M.H. et al.; "Submicron Patterning of Thin Cobalt Films for Magnetic Storage"; Journal of Vacuum Science Technology; B12(6); Nov./Dec. 1994; pp. 3196-3201 (abstract).

(Continued)

*Primary Examiner* — Kevin Bernatz
(74) *Attorney, Agent, or Firm* — Nixon & Vanderhye, P.C.

(57) ABSTRACT

According to one embodiment, a magnetic recording medium includes a data region and a servo region adjacent to the data region and including a magnetic recording layer, the magnetic recording layer including first and second patterned regions adjacent to each other, the first patterned region including a first nonmagnetic matrix and first magnetic particles dispersed in the first nonmagnetic matrix and having magnetization oriented in a first direction, the second patterned region includes a second nonmagnetic matrix and second magnetic particles dispersed in the second nonmagnetic matrix and having magnetization oriented in a second direction opposite to the first direction, sizes of the first magnetic particles being smaller than sizes of the second magnetic particles.

5 Claims, 8 Drawing Sheets

(51) Int. Cl.
*G11B 5/82* (2006.01)
*G11B 5/855* (2006.01)

(56) References Cited

U.S. PATENT DOCUMENTS

| | | | |
|---|---|---|---|
| 5,411,630 A | 5/1995 | Nagase et al. | |
| 5,587,223 A | 12/1996 | White | |
| 5,590,009 A | 12/1996 | Ishida | |
| 5,604,013 A | 2/1997 | Yamaguchi et al. | |
| 5,652,054 A | 7/1997 | Kikitsu et al. | |
| 5,675,532 A | 10/1997 | Gemma et al. | |
| 5,956,216 A | 9/1999 | Chou | |
| 5,981,054 A | 11/1999 | Hikosaka et al. | |
| 6,021,013 A | 2/2000 | Albrecht et al. | |
| 6,125,095 A | 9/2000 | Gemma et al. | |
| 6,162,532 A | 12/2000 | Black et al. | |
| 6,168,845 B1 | 1/2001 | Fontana et al. | |
| 6,183,832 B1 | 2/2001 | Margulies et al. | |
| 6,197,399 B1 | 3/2001 | Naito et al. | |
| 6,249,396 B1 | 6/2001 | Gray | |
| 6,271,994 B1 | 8/2001 | Saito et al. | |
| 6,303,277 B1 | 10/2001 | Hieda et al. | |
| 6,387,530 B1 | 5/2002 | Liu et al. | |
| 6,421,195 B1 | 7/2002 | Rubin et al. | |
| 6,537,638 B2 | 3/2003 | Do et al. | |
| 6,565,763 B1 | 5/2003 | Asakawa et al. | |
| 6,565,764 B2 | 5/2003 | Hiraoka et al. | |
| 6,602,620 B1 | 8/2003 | Kikitsu et al. | |
| 6,661,592 B2 | 12/2003 | Richter et al. | |
| 6,748,865 B2 | 6/2004 | Sakurai et al. | |
| 6,804,175 B2 | 10/2004 | Rulgrok et al. | |
| 6,841,224 B2 | 1/2005 | Kamata et al. | |
| 6,850,480 B1 | 2/2005 | Naito et al. | |
| 6,977,108 B2 | 12/2005 | Hieda et al. | |
| 7,115,208 B2 | 10/2006 | Hieda et al. | |
| 7,230,790 B1 | 6/2007 | Mallary et al. | |
| 7,306,743 B2 | 12/2007 | Hieda et al. | |
| 7,524,428 B2 | 4/2009 | Fujimoto et al. | |
| 7,879,468 B2 * | 2/2011 | Uchida | 428/831.2 |
| 8,130,468 B2 | 3/2012 | Albrecht et al. | 360/135 |
| 8,693,127 B2 * | 4/2014 | Jubert | 360/57 |
| 8,711,519 B2 * | 4/2014 | Fan et al. | 360/135 |
| 2002/0048695 A1 * | 4/2002 | Sakawaki et al. | 428/694 TS |
| 2002/0132083 A1 | 9/2002 | Weller et al. | |
| 2002/0168548 A1 | 11/2002 | Sakurai et al. | |
| 2003/0072971 A1 | 4/2003 | Fukutani | |
| 2003/0090826 A1 | 5/2003 | Richter et al. | |
| 2004/0107355 A1 | 6/2004 | Sakurai et al. | |
| 2004/0191577 A1 | 9/2004 | Suwa et al. | |
| 2005/0255336 A1 | 11/2005 | Mukai | |
| 2005/0255337 A1 | 11/2005 | Mukai | |
| 2007/0026265 A1 * | 2/2007 | Sakurai et al. | 428/848.3 |
| 2007/0291078 A1 * | 12/2007 | Drury | 347/41 |
| 2008/0218906 A1 * | 9/2008 | Uchida | 360/131 |
| 2009/0067092 A1 | 3/2009 | Suwa et al. | |
| 2009/0086358 A1 * | 4/2009 | Van de Veerdonk et al. | 360/55 |
| 2009/0135519 A1 * | 5/2009 | Hieda et al. | 360/110 |
| 2009/0207523 A1 * | 8/2009 | Kawabe et al. | 360/110 |
| 2010/0039728 A1 | 2/2010 | Suzuki | |
| 2010/0119876 A1 * | 5/2010 | Uchida | 428/827 |
| 2010/0302682 A1 * | 12/2010 | Hinoue et al. | 360/135 |
| 2011/0164337 A1 * | 7/2011 | Kimura et al. | 360/135 |
| 2011/0199867 A1 * | 8/2011 | Stipe | 369/13.24 |
| 2011/0311840 A1 * | 12/2011 | Uchida | 428/828 |
| 2012/0092790 A1 * | 4/2012 | Hellwig et al. | 360/59 |

FOREIGN PATENT DOCUMENTS

| | | |
|---|---|---|
| JP | 03-22211 | 1/1991 |
| JP | 03-028559 U | 3/1991 |
| JP | 06-231443 | 8/1994 |
| JP | 07-272239 | 10/1995 |
| JP | 10-255258 | 9/1998 |
| JP | 63-261578 | 10/1998 |
| JP | 2000-195034 | 7/2000 |
| JP | 2000-195036 | 7/2000 |
| JP | 2000-215441 | 8/2000 |
| JP | 2000-251236 | 9/2000 |
| JP | 2004-295989 | 10/2004 |
| JP | 2006-252772 | 9/2006 |
| JP | 2007-200466 | 8/2007 |
| JP | 2008-217908 | 9/2008 |
| JP | 2009-117013 | 5/2009 |
| JP | 2009-193636 | 8/2009 |

OTHER PUBLICATIONS

Chou et al., "Nanolithographically Defined Magnetic Structures and Quantum Magnetic Disk"; Apr. 15, 1996; J. Appl. Phys.; vol. 79; No. 8; pp. 6101-6106.

Zhu et al., "Micromagnetic Study of Network Media"; Jul. 1998; IEEE Trans. Magn.; vol. 34; No. 4; pp. 1609-1611 (abstract).

Segalman, R.A. et al., "Controlling the Long Range Ordering of Block Copolymer Micelle Filma", Abstract Submitted for the MAR00 Meeting of the American Physical Society; Nov. 30, 1999; 2 pages.

English-language Machine Translation of JP 2000-195036.

Kikitsu et al., U.S. Appl. No. 09/472,250, filed Dec. 27, 1999.

Hieda et al., U.S. Appl. No. 10/102,812, filed Mar. 22, 2002.

Hieda et al., U.S. Appl. No. 11/000,170, filed Dec. 1, 2004.

Hieda et al., U.S. Appl. No. 11/493,807, filed Jul. 27, 2006.

Office Action dated Feb. 28, 2012 in JP Application No. 2010-093336 with English-language translation.

Shaw et al., "Reversal Mechanisms in Perpendicularly Magnetized Nanostructures", Physical Review B 78, pp. 024414-1-024414-5, Jul. 16, 2008.

* cited by examiner

MAGNETIC RECORDING MEDIUM WITH MAGNETIC PORTIONS OF DIFFERENT ORIENTATIONS AND METHOD OF MANUFACTURING THE SAME

This application is a divisional of U.S. application Ser. No. 13/064,463, filed Mar. 25, 2011, which is based upon and claims the benefit of priority from Japanese Patent Application No. 2010-093336, filed Apr. 14, 2010. The entire contents of each of these applications are incorporated herein by reference.

CROSS-REFERENCE TO RELATED APPLICATIONS

This application is based upon and claims the benefit of priority from Japanese Patent Application No. 2010-093336, filed Apr. 14, 2010; the entire contents of which are incorporated herein by reference.

FIELD

Embodiments described herein relate generally to a magnetic recording medium and a method of manufacturing the same.

BACKGROUND

JP-A 2004-295989(KOKAI) discloses a magnetic recording medium having a data region formed in such a manner that after a magnetic material is segmented a nonmagnetic material is buried in gaps. As disclosed in JP-A 2004-295989 (KOKAI), recesses of a data region caused by microfabrication can be reduced to some extent by burying the nonmagnetic material. However, a problem still remains in that a recess is generated between a data region and servo region. Since a deterioration of surface flatness of a magnetic recording medium results in unstable flying of a magnetic recording head and deteriorates a performance of the magnetic recording head as the magnetic recording medium, it is expected to improve the surface flatness.

JP-A 2009-193636(KOKAI) discloses a magnetic recording medium of a bit patterned medium (BPM) system having a magnetic section and a nonmagnetic section in a servo region. In the magnetic recording medium disclosed in JP-A 2009-193636(KOKAI), since the nonmagnetic section has no magnetism, a difference between signals is small between the magnetic section and the nonmagnetic section. As a result, it is difficult to accurately read information on the servo region by a magnetic recording head.

Further, it requires a lot of steps to manufacture the magnetic recording mediums as described in JP-A 2004-295989 (KOKAI) and 2009-193636(KOKAI).

DETAILED DESCRIPTION

Figure 1:
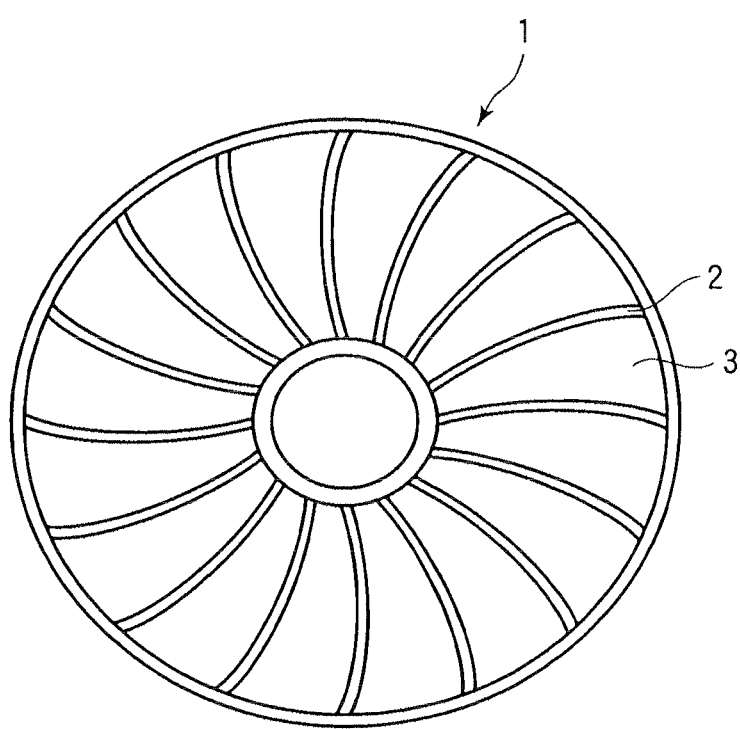
FIG. 1 is a schematic plan view of a magnetic recording medium according to an embodiment.

In general, according to one embodiment, a magnetic recording medium comprises a data region and a servo region adjacent to the data region and including a magnetic recording layer, the magnetic recording layer comprising first and second patterned regions adjacent to each other, the first patterned region comprising a first nonmagnetic matrix and first magnetic particles dispersed in the first nonmagnetic matrix and having magnetization oriented in a first direction, the second patterned region comprises a second nonmagnetic matrix and second magnetic particles dispersed in the second nonmagnetic matrix and having magnetization oriented in a second direction opposite to the first direction, sizes of the first magnetic particles being smaller than sizes of the second magnetic particles.

Embodiments will be explained below referring to the drawings.

FIG. 1 shows a schematic plan view of a magnetic recording medium 1 according to an embodiment. FIG. 1 is a view of the magnetic recording medium 1 when viewed from an upper surface. As shown in FIG. 1, a servo region 2 and a data region 3 exist in the magnetic recording medium 1. The data region 3 is a region in which user data is recorded, and the servo region 2 is a region in which a servo signal necessary to write and read the user data is held.

On the magnetic recording medium 1, the servo region 2 is formed in an arc shape corresponding to a locus which a head slider accesses on the servo region 2. The length of the servo region 2 in a circumferential direction is formed longer as a radius position approaches an outer side of the servo region 2. Although 16 servo regions 2 are shown in FIG. 1, 100 or more servo regions 2 are formed in an actual medium.

Figure 2A:
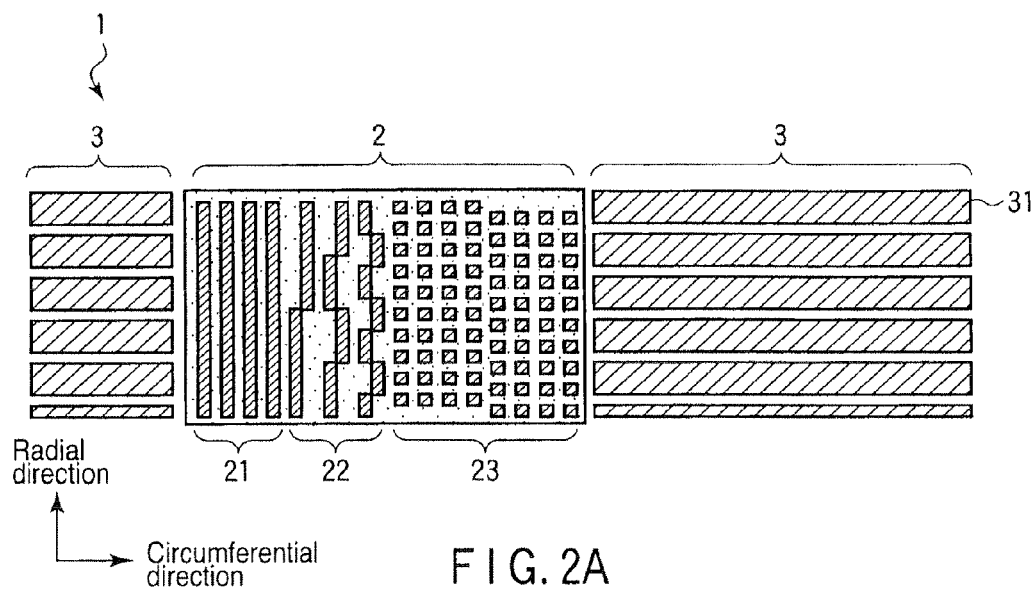
FIGS. 2A and 2B are plan views along a circumferential direction of the magnetic recording medium according to the embodiment.
Figure 2B:
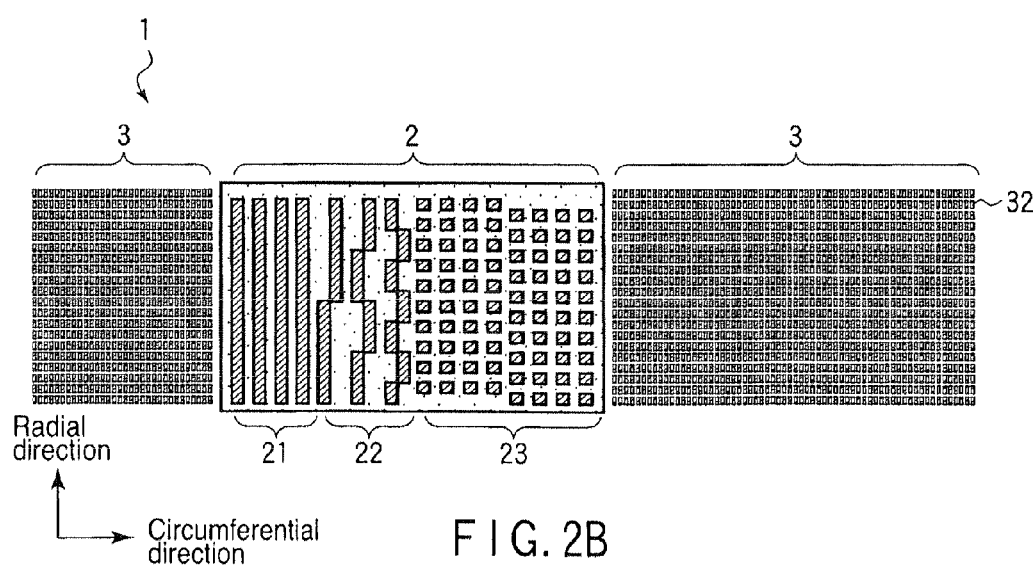

FIGS. 2A and 2B show plan views of the magnetic recording medium 1 according to the embodiment along a circumferential direction.

FIGS. 2A and 2B are enlarged schematic views of a portion which is across the servo region 2 and cut out from the overall image of the magnetic recording medium 1 of FIG. 1. A right direction on the sheet shows a circumferential direction of the magnetic recording medium 1. An upper direction on the sheet shows a radial direction of the magnetic recording medium 1.

FIG. 2A shows a magnetic recording medium (discrete track medium, DTR) in which the data region 3 includes a granular magnetic material 31 separated by a nonmagnetic material in a radial direction. The granular magnetic material 31 (which is also called a granular structure) comprises minute magnetic particles having magnetism, which are dispersed in a base material of a nonmagnetic material.

FIG. 2B shows a magnetic recording medium (bit patterned medium, BPM) in which the data region 3 includes magnetic dots 32 segmented in a dot state. The magnetic recording medium 1 can configure the data region 3 in any mode of DTR and BPM.

As shown in FIGS. 2A and 2B, the servo region 2 includes a preamble section 21, an address section 22, and a burst section 23. The preamble section 21, the address section 22 and the burst section 23 of the servo region 2 are formed with patterns for providing a servo signal.

The preamble section 21 is performed on PLL (Phase Locked Loop) processing for synchronizing a servo signal read clock with respect to the time lag caused by the rotational deviation of the medium. The preamble section 21 is also performed on AGO (Auto Gain Control) processing for properly maintaining a signal read amplitude. In the preamble section 21, protruded recording regions which continue without being segmented in the radius direction and have a circular-arc shape are repeatedly formed in the circumferential direction.

The address section 22 has a servo signal recognition code called a servo mark, sector data, and cylinder data, which are formed in Manchester code and the like at the same pitch as the circumferential pitch of the preamble section 21. The cylinder data vary from one servo track to another servo track. Thus, in order to minimize the difference in the cylinder data between adjacent tracks and thus minimize the influence of an address read error on the seek operation, the cylinder data are recorded as data converted into Gray code and then Mnachester coded.

In the burst section 23, an off-track detection region for detecting the off-track amount from the cylinder address in the on-track state is formed.

Figure 3:
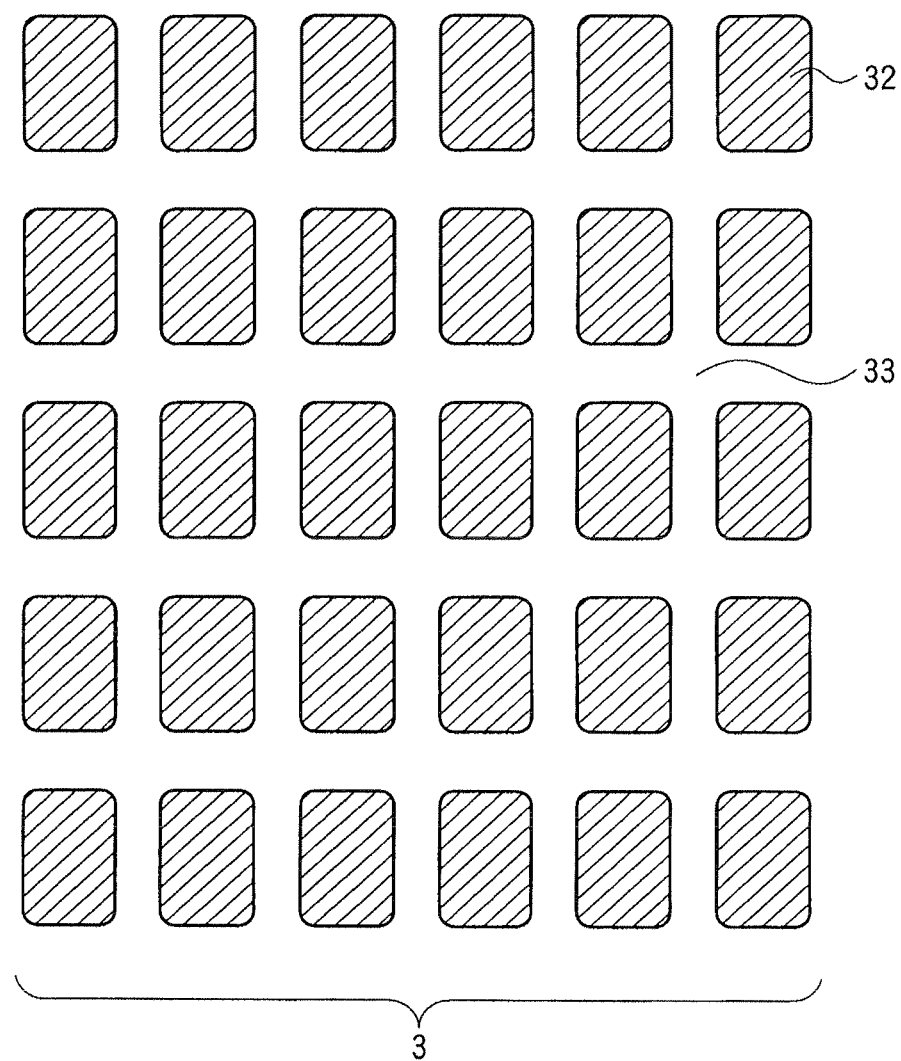
FIG. 3 is an enlarged plan view of a data region of the magnetic recording medium according to the embodiment.

FIG. 3 shows an enlarged plan view of the data region 3. The data region 3 shown in FIG. 3 is used in the magnetic recording medium 1 having the configuration of a BPM. As shown in FIG. 3, the data region 3 includes the magnetic dots 32 and a nonmagnetic matrix 33. The magnetic dot 32 includes a magnetic material and acts as a minimum recording unit of the user data. The nonmagnetic matrix 33 includes a nonmagnetic material and has a role for physically and magnetically separating the magnetic dots 32.

The nonmagnetic matrix 33 mainly includes a nonmagnetic material and is defined as a structure that buries the space between the magnetic structures (magnetic dots 32) to separate the structures from each other. Likewise, a nonmagnetic matrix 28 in the servo region to be described later mainly includes a nonmagnetic material, and the nonmagnetic matrix 28 is a structure that buries the space between the magnetic structures (first magnetic particles 26 and second magnetic particles 27).

Figure 4:
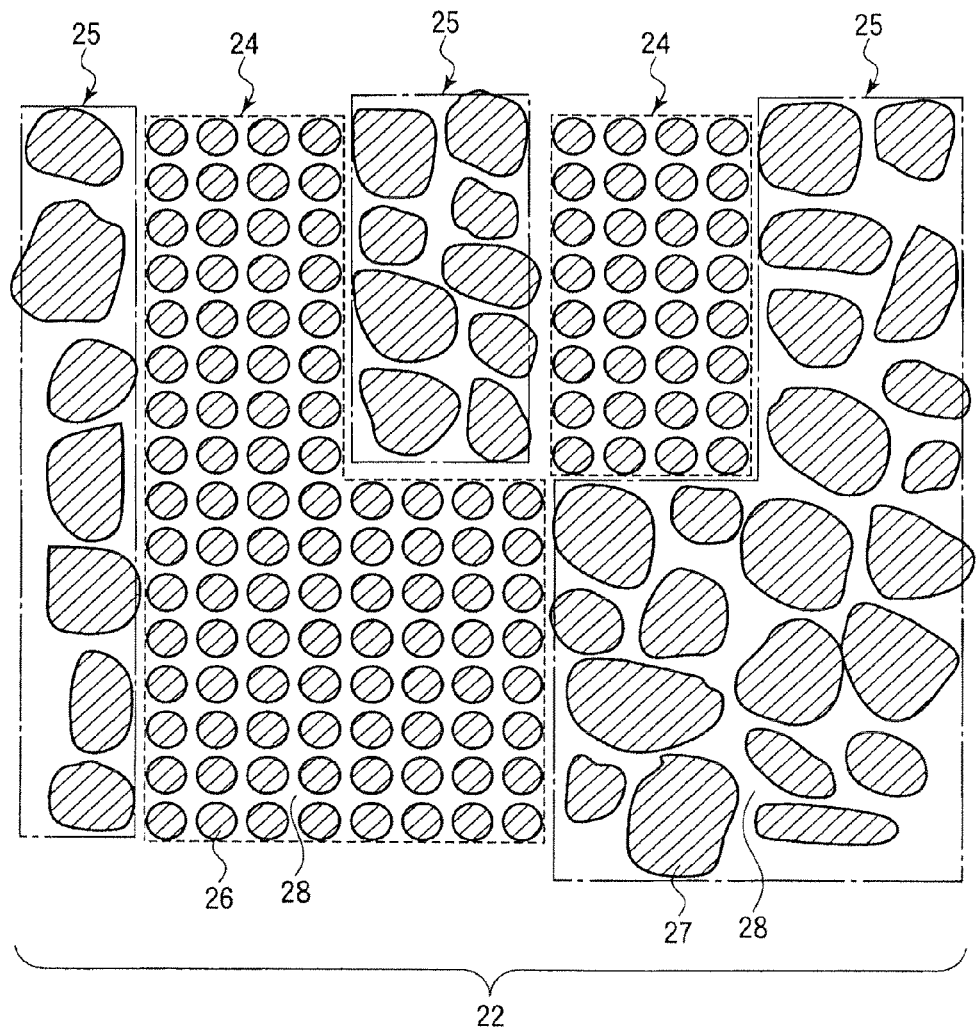
FIG. 4 is an enlarged plan view of an address section of the magnetic recording medium according to the embodiment.
Figure 5:
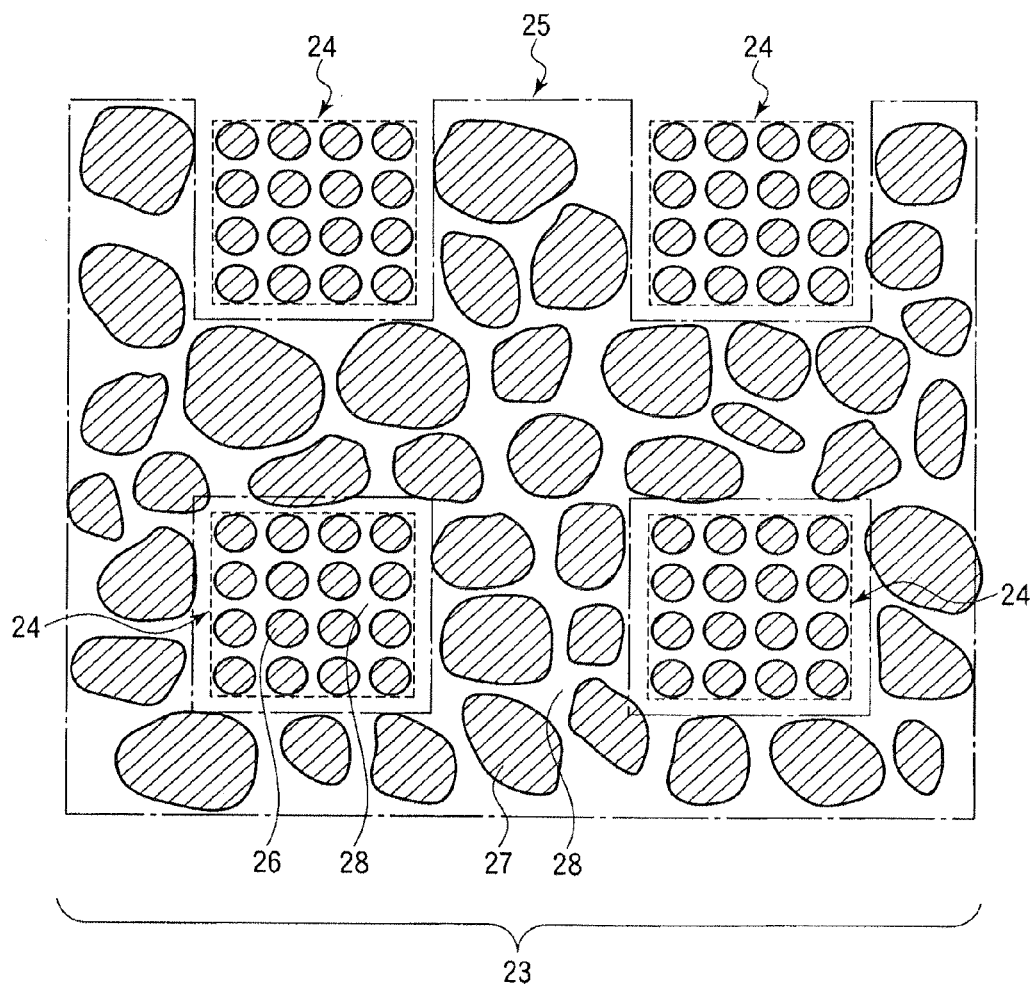
FIG. 5 is an enlarged plan view of a burst section of the magnetic recording medium according to the embodiment.

FIG. 4 shows an enlarged view of the address section 22 of the magnetic recording medium 1. FIG. 5 shows an enlarged view of the burst section 23.

As shown in FIG. 4, the address section 22 is formed by ensembles of magnetic particles shown by reference numerals 26 and 27. In FIG. 4, small magnetic particles, which have a predetermined size and are disposed uniformly, are called first magnetic particles 26. In FIG. 4, magnetic particles, which have various sizes, are disposed at random, and are larger than the first magnetic particles 26, are called second magnetic particles 27. Further, the structure, which buries the peripheries of the first magnetic particles 26 and the second magnetic particles 27, is called the nonmagnetic matrix 28. Further, a region, which is surrounded by a broken line in FIG. 4, and in which the first magnetic particles 26 are collected, is called a first region 24. Further, a region, which is surrounded by a dotted line in FIG. 4 and in which the second magnetic particles 27 are collected, is called a second region 25.

Patterns are formed to the address section 22 by disposing the first region 24 and the second region 25 on specific positions.

The structure, to which slant lines are attached in the address section 22 of FIG. 2A or 2B and which is drawn in a rectangle, corresponds to the first region 24 shown in FIG. 4. The structure, which is drawn as a blank in the address section 22 of FIGS. 2A and 2B, corresponds to the second region 25.

Like the address section 22, the burst section 23 shown in FIG. 5 is also formed by ensembles of the first magnetic particles 26 and the second magnetic particles 27, and the peripheries of these magnetic particles are buried by the nonmagnetic matrix 28. Further, the first region 24 in which the first magnetic particles 26 are collected and the second region 25 in which the second magnetic particles 27 are collected are present. The structure, to which slant lines are attached and which is drawn in a square in the burst section 23 of FIG. 2A or 2B, corresponds to the first region 24 shown in FIG. 5. Further, the structure, which is drawn in blank in the burst section 23 of FIG. 2A or 2B, corresponds to the second region 25 shown in FIG. S.

Like the address section 22 and the burst section 23, the preamble section 21 is also formed by collecting the first magnetic particles 26, the second magnetic particles 27, and the nonmagnetic matrix 28, and the patterns of the preamble section 21 are formed by the dispositions of the first region 24 and the second region 25.

The size (sectional area viewed from an upper surface) of the first magnetic particles 26, which exists in the first region 24 of the servo region 2, is as large as or smaller than the magnetic dots 32 of the data region 3 shown in FIG. 3 (magnetic recording medium according to BPM).

Further, when the data region 3 of the magnetic recording medium 1 has the structure of a DTR, the data region 3 includes a track in which a magnetic material is segmented by a nonmagnetic material in the radial direction as shown in FIG. 2A.

The first magnetic particles 26 and the second magnetic particles 27 can be magnetized. However, since the size of the first magnetic particles 26 is different from the size of the second magnetic particles, the first magnetic particles and the second magnetic particles have a different coercive force. In general, it is known that even if magnetic particles are formed of the same material, magnetic particles having a smaller size are less influenced by a diamagnetic field, with a result that the magnetic particles having the smaller size have a larger coercive force. The size of the first magnetic particles 26 is smaller than the size of the second magnetic particles. Thus, the coercive force Hc1 of the first magnetic particles 26 becomes higher than the coercive force Hc2 of the second magnetic particles 27. The magnetic recording medium 1 magnetizes the first magnetic particles 26 and the second magnetic particles 27 in an opposite direction, respectively making use of the difference between the coercive forces. That is, after a magnetic recording layer including the first magnetic particles 26 and the second magnetic particles 27 is formed, the magnetic recording layer is first magnetized by a magnetic force higher than Hc1 so that the first magnetic particles 26 and the second magnetic particles 27 are magnetized in the same direction. Thereafter, the second magnetic particles 27 are magnetized in an opposite direction by a magnetic force lower than Hc1 and higher than Hc2 so that only the magnetization of the second magnetic particles 27 is inverted. At the time, since the magnetization of the second magnetic particles 27 is stabilized by the diamagnetic field generated from the first magnetic particles 26, the occurrence of reverse magnetization in the second magnetic particles 27 can be prevented. With the operation, the first region 24 and the second region 25 in the servo region 2 form not only patterns depending on a difference between the sizes of magnetic particles that constitutes the first region 24 and the second region 25 but also magnetic patterns. The magnetic pattern functions as the servo patterns of the magnetic recording medium 1.

Since the magnetic recording medium 1 has the feature, the magnetic recording medium 1 stabilizes the signal held by the servo region 2.

In a conventional magnetic recording medium of a DTR system or a BPM system, a servo region is formed of a magnetic material section and a nonmagnetic material section.

In contrast, in the magnetic recording medium 1, the servo region 2 is formed of a magnetic material magnetized in a specific direction (first direction) and a magnetic material magnetized in a direction opposite to the direction (second direction). Therefore, a difference between signals in a pattern is made more definite in the servo region 2 of the magnetic recording medium 1 than in a conventional DTR or BPM servo region, thereby servo information can be read accurately by a recording head. Magnetization directions (first and second directions) are notably parallel with the film thickness direction of the magnetic recording layer 7 (vertical to a film surface). This is because the parallel directions are suitable to increase a recording density of the magnetic recording medium.

Next, the structure of the magnetic recording medium 1 according to the first embodiment will be explained using a sectional view.

Figure 6:
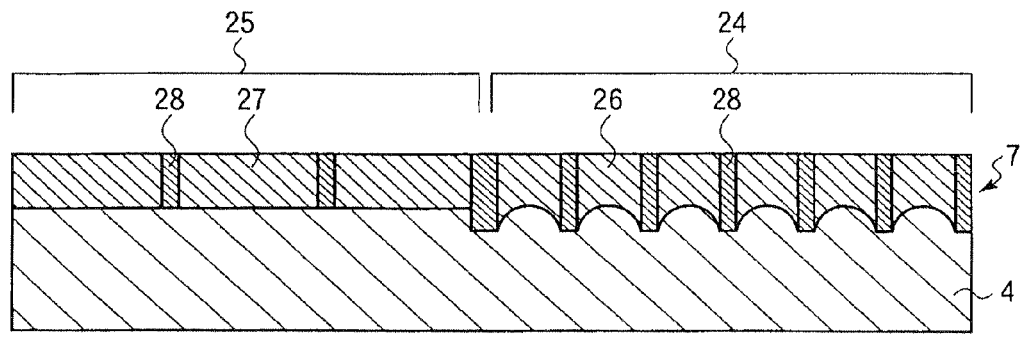
FIG. 6 is a sectional view showing a servo region of a magnetic recording medium according to a first embodiment.

FIG. 6 shows a sectional view of the servo region 2 of the magnetic recording medium 1 according to the first embodiment. In the magnetic recording medium 1 according to the first embodiment, a soft magnetic underlayer (not shown), an underlayer 4, a magnetic recording layer 7, and a protective film (not shown) are laminated on a substrate (not shown) in this order. The underlayer 4 is a layer to control the easy axis of magnetization of the magnetic particles of the magnetic recording layer 7 formed on the underlayer 4 and to orient the directions of the easy axis of magnetization in a direction vertical to the film surface. Further, a lubrication agent such as perfluoropolyether is appropriately applied on the protective film. FIG. 6 shows only the underlayer 4 and the magnetic recording layer 7.

The magnetic recording layer 7 has the first region 24 and the second region 25. In the first region 24, the first magnetic particles 26 are separated by the nonmagnetic matrix 28 in a direction vertical to the laminate direction of the magnetic recording layer 7. In the second region 25, the second magnetic particles 27 are separated by the nonmagnetic matrix 28 in a direction vertical to the laminate direction of the magnetic recording layer 7.

In the first region 24, the surface of the underlayer 4 includes a plurality of protrusions. In the second region 25, the surface of the underlayer 4 is flat. The first magnetic particles 26 exist on the protrusions of the underlayer 4. Further, in the second region 25, the second magnetic particles 27 exist on the surface of the underlayer 4.

The data region 3 is also formed of the magnetic recording layer 7 on the underlayer 4 like the servo region 2, and a plurality of protrusions is formed on the surface of the underlayer 4. Also in the data region 3, the magnetic dots 32 are formed on the protrusions of the underlayer 4 like the first region 24. When the magnetic recording medium 1 is of the DTR system, protrusions exist on the surface of the underlayer 4 of the section in which the magnetic particles exist in the granular magnetic material 31 which configures the data region 3. In contrast, the surface of the underlayer 4 of the section in which the nonmagnetic material exists is flat.

The structure including the first magnetic particles 26 and the second magnetic particles 27 as shown in FIG. 6 can be formed by employing a concavo-convex structure on the surface of the underlayer 4. In the magnetic recording medium 1, protrusions are formed on a part of the surface of the underlayer 4, and the first magnetic particles 26 are formed on the protrusions. In contrast, the other part of the surface of the underlayer 4 is made flat, and the second magnetic particles 27 are formed on the flat surface.

Although the height of the protrusions formed on the surface of the underlayer 4 can be appropriately selected depending on the condition of forming the magnetic recording layer 7, the height is notably 1 nm or more. In contrast, in the region in which the surface of the underlayer 4 is flat, the arithmetic average roughness (Ra) of the surface is notably less than 0.5 nm. When the magnetic recording layer 7 is formed on the underlayer 4 having such a surface shape, the first magnetic particles 26 and the second magnetic particles 27 are formed in a different mode in the region having the protrusions of the underlayer 4 and in the region which is flat, respectively.

In the region having the protrusions of the underlayer 4 (which corresponds to the first region 24), the magnetic material included in the magnetic recording layer 7 is epitaxially grown selectively on the respective protrusions, and the fine first magnetic particles 26 are formed. In contrast, the nonmagnetic material included in the magnetic recording layer 7 is selectively grown between the protrusions of the underlayer 4 and becomes the nonmagnetic matrix 28.

In the region in which the surface of the underlayer 4 is flat (which corresponds to the second region 25), since a protrusion which acts as a start point of growth does not exist, the magnetic material included in the magnetic recording layer 7 is grown from sparse positions, and thus the second magnetic particles 27 which are larger than the first magnetic particles 26 are formed. At the time, the nonmagnetic material included in the magnetic recording layer 7 is formed to surround the second magnetic particles 27 and becomes the nonmagnetic matrix 28.

In the magnetic recording medium 1 according to the embodiment, the underlayer 4 is previously processed and the magnetic material and the nonmagnetic material are selectively formed on the underlayer 4. Accordingly, since it is not necessary to perform etching to the magnetic material in a manufacturing process, the surface of the magnetic recording layer 7 is unlikely to be made rough. Accordingly, since the magnetic recording layer 7 having a high flatness can be provided, data can be written and read by a magnetic read/write head accurately.

Since the underlayer 4 is previously processed, the magnetic recording medium 1 can be manufactured by a small number of steps.

Figure 7:
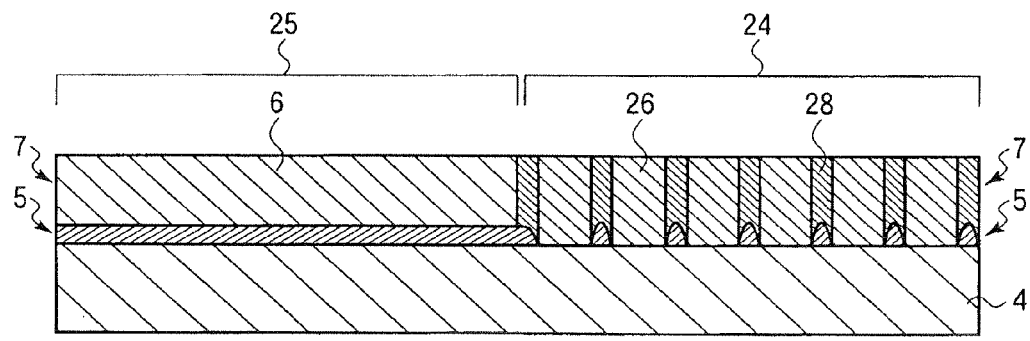
FIG. 7 is a sectional view showing a servo region of a magnetic recording medium according to a second embodiment.
Figure 9A:
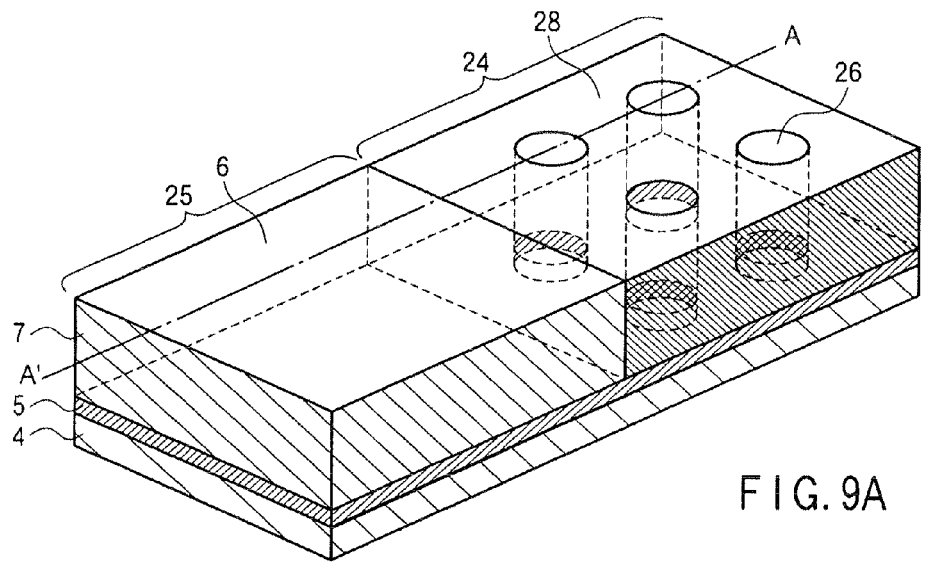
FIGS. 9A and 9B are perspective views showing servo regions, which are partly broken, of magnetic recording mediums according to second and third embodiments, respectively.

FIG. 7 shows a sectional view of a servo region 2 of a magnetic recording medium 1 according to a second embodiment. FIG. 9A shows a perspective view of the servo region 2 which is partly broken. In FIG. 9A, the structure of a magnetic recording layer 7 is shown transparently using broken lines. The sectional view of the servo region 2 of the magnetic recording medium 1 shown in FIG. 7 corresponds to a sectional view taken along an A-A' line in FIG. 9A.

In the magnetic recording medium 1 according to the embodiment, an interlayer 5, which includes any material of oxides, nitrides, or organic substances, exists between an underlayer 4 and the magnetic recording layer 7. As shown in FIG. 7, in a first region 24, the interlayer 5 is formed with a plurality of holes which pass from the surface of the interlayer 5 to the surface of the underlayer 4, and the underlayer 4 is exposed on the bottom section of the interlayer 5. First magnetic particles 26 are buried in the holes. The holes correspond to the section of the interlayer 5 in which first magnetic particles 26 shown in FIG. 9A are formed.

In a second region 25, the interlayer 5 is made to a flat layer. A non-oriented part 6 is formed on the interlayer 5. Since no non-oriented part 6 is formed on the underlayer 4, easy axes of magnetization of the thus formed magnetic particles on section 6 face an arbitrary direction to a film surface. Note that the easy axes of magnetization of the magnetic particles on section 6 preferably face an in-plane direction of a film surface and do not face a vertical direction of the film surface. Since the surface of the interlayer 5 is flat, a magnetic material which configures the non-oriented part 6 is formed on the interlayer 5 in a shape larger than the first magnetic particles 26, and a nonmagnetic material surrounds the periphery of the magnetic material. Since the magnetic material has the large size, the coercive force of the magnetic material is also lower than the first magnetic particles 26.

In the embodiment, the servo patterns of the servo region 2 are formed by the first region 24 and the second region 25.

Although FIG. 9A shows four of the holes and four of the first magnetic particles 26 formed in the holes at intervals, actually, more holes and more first magnetic particles 26 can be formed more densely.

The structure of the magnetic recording layer 7 shown in FIG. 7 can be formed by processing the interlayer 5. When the magnetic recording layer 7 is formed to the interlayer 5 having the region (first region 24) which includes the holes and the flat region (second region 25) as shown in FIG. 7 and FIG. 9A, the magnetic recording layer 7 is formed in a different mode in the respective regions.

In the regions having the holes, a magnetic material included in the magnetic recording layer 7 is epitaxially grown selectively from the surface of the underlayer 4 where the holes are formed so that the first magnetic particles 26 are formed. In contrast, the nonmagnetic material included in the magnetic recording layer 7 is selectively grown on the interlayer 5 so that a nonmagnetic matrix 28 is formed so as to surround the first magnetic particles 26.

In contrast, in the flat region (the second region 25), since a start point from which a magnetic material grows does not exist on the surface of the interlayer 5, a magnetic material which configures the non-oriented part 6 is oriented on the interlayer 5 in a shape larger than the first magnetic particles 26, and a nonmagnetic material is formed surrounding the periphery of the magnetic material.

In a data region 3 of the embodiment, the interlayer 5 and the magnetic recording layer 7 are sequentially formed on the underlayer 4 like the servo region 2. Also, in the data region 3, a plurality of holes are formed passing from the surface of the interlayer 5 up to the surface of the underlayer 4 like the first region 24. Magnetic dots 32 are formed to the holes. A nonmagnetic material is formed on the interlayer 5 where the holes are not formed. The nonmagnetic material is formed to surround the magnetic dots 32.

Figure 8:
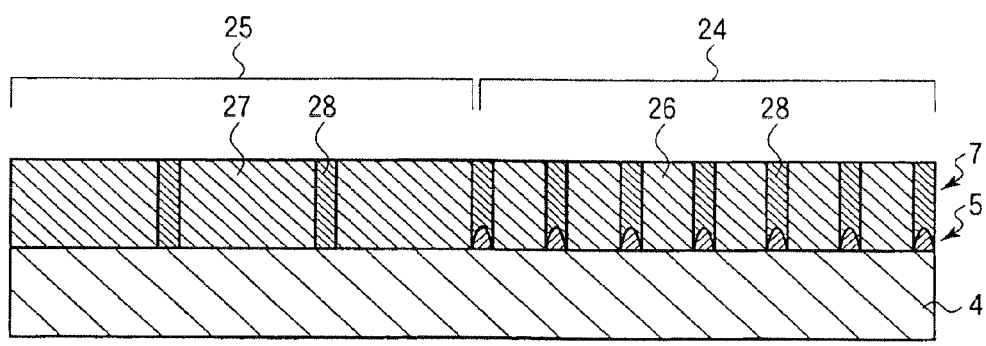
FIG. 8 is a sectional view showing a servo region of a magnetic recording medium according to a third embodiment.
Figure 9B:
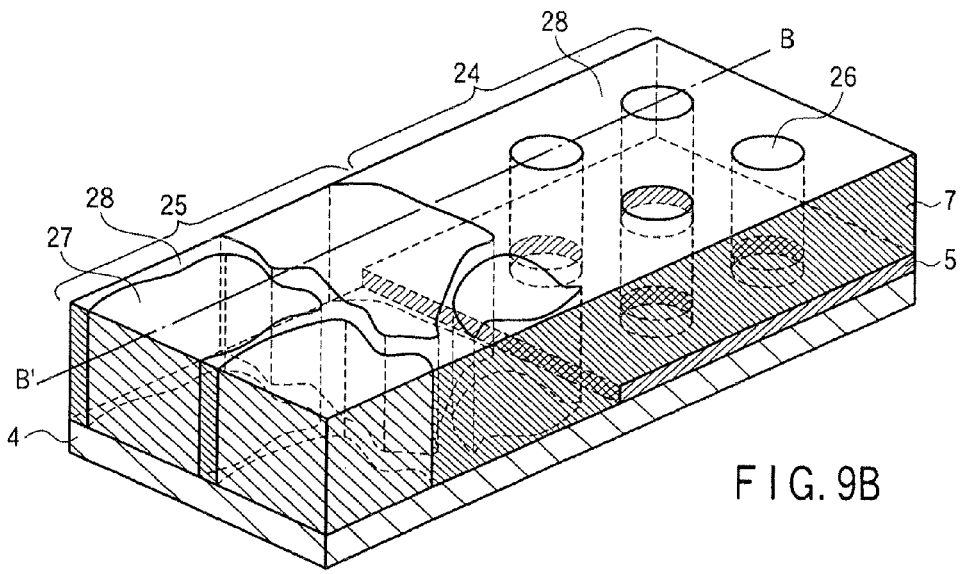

FIG. 8 shows a sectional view of a servo region 2 of a magnetic recording medium 1 according to a third embodiment. Further, FIG. 9B shows a perspective view of the servo region 2 which is partly broken. In FIG. 9B, the structure of a magnetic recording layer 7 is shown transparently using broken lines. The sectional view of the servo region 2 of the magnetic recording medium 1 shown in FIG. 8 corresponds to the sectional view taken along a line B-B' in FIG. 9B.

In the magnetic recording medium 1 according to the embodiment, an interlayer 5 including any material of oxides, nitrides, or organic substances exists between an underlayer 4 and the magnetic recording layer 7 in a first region 24. In contrast, in a second region 25, no interlayer 5 exists on the underlayer 4.

As shown in FIG. 8, a plurality of holes, which pass from the surface of the interlayer 5 up to the surface of the underlayer 4, are formed to the interlayer 5, and the underlayer 4 is exposed on the bottom section of the interlayer 5. First magnetic particles 26 are buried in the holes. The holes correspond to the section of the interlayer 5 to which the first magnetic particles 26 shown in FIG. 9B are formed. A nonmagnetic matrix 28 is formed to surround the first magnetic particles 26.

In contrast, second magnetic particles 27, each of which has a sparse size and a sparse disposition, and the nonmagnetic matrix 28, which buries the peripheries of the second magnetic particles 27, exist in the region (second region 25) of the underlayer 4 in which no interlayer 5 is formed. The servo patterns of the servo region 2 are formed of the first region 24, in which magnetic particles whose magnetization faces a direction by being applied with a magnetic field as described above are collected, and a second region 25 in which magnetic particles whose magnetization faces a direction opposite to the above direction are collected.

Although FIG. 9B shows four of the holes and four of the first magnetic particles 26 formed in the holes at intervals, actually, more holes and more first magnetic particles 26 can be formed more densely.

The structure of the magnetic recording layer 7 shown in FIG. 8 can be formed by processing the interlayer 5. When the magnetic recording layer 7 is formed to the region (first region 24) having the holes and to the region of the underlayer (second region 25) to which no interlayer 5 is formed as shown in FIGS. 8 and 9B, the magnetic recording layer 7 is formed in a different mode in the respective regions.

In the regions having the holes, a magnetic material included in the magnetic recording layer 7 is epitaxially grown selectively from the surface of the underlayer 4 where the holes are formed so that the first magnetic particles 26 are formed. In contrast, the nonmagnetic material included in the magnetic recording layer 7 is selectively grown on the interlayer 5 so as to surround the first magnetic particles 26 so that a nonmagnetic matrix 28 is formed.

In contrast, in the region of the underlayer 4 in which the interlayer 5 is not formed, since no protrusion acting as a start point of growth exists, a magnetic material included in the magnetic recording layer 7 is grown from sparse positions, and thus the second magnetic particles 27 larger than the first magnetic particles 26 are formed. At the time, the nonmagnetic material included in the magnetic recording layer 7 is formed to surround the second magnetic particles 27 and becomes the nonmagnetic matrix 28.

Also in the embodiment, like the second embodiment, the data region 3 has the interlayer 5 and the magnetic recording layer 7 sequentially formed on the underlayer 4 like in the servo region 2. Also in the data region 3, a plurality of holes are formed passing from the surface of the interlayer 5 up to the surface of the underlayer 4 like the first region 24. The holes are formed with magnetic dots 32. A nonmagnetic material is formed on the interlayer 5 on which no hole is formed. The nonmagnetic material is formed to surround the magnetic dots 32.

Figure 10A:
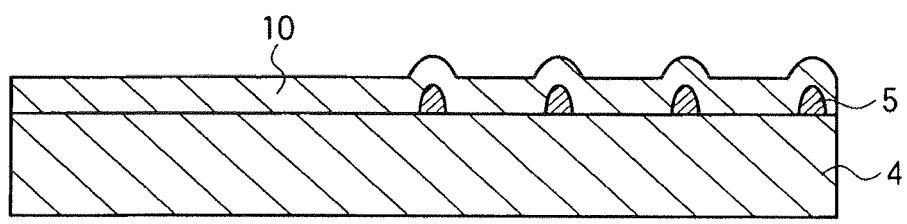
FIGS. 10A and 10B are sectional views showing an embodiment of a magnetic recording medium while it is being manufactured.
Figure 10B:
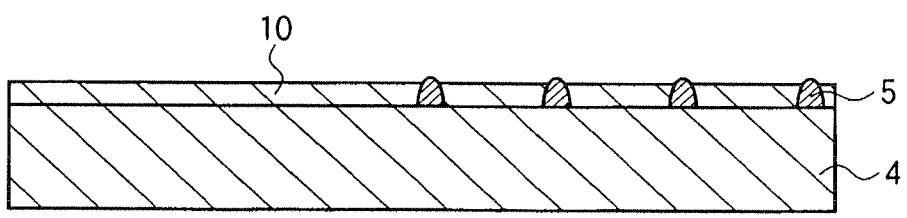

In addition to the modes of processing of the surface of the underlayer 4 in the first to third embodiments, the surface of the underlayer 4 can be processed as shown in, for example, FIGS. 10A and 10B. FIGS. 10A and 10B are sectional views showing a state just before the magnetic recording layer 7 is formed.

In FIG. 10A, after the interlayer 5 is formed on the underlayer 4, a second underlayer 10, which includes the same material as the underlayer 4, is further formed on the underlayer 4.

In FIG. 10B, after the second underlayer 10 is formed like FIG. 10A, the surface of the second underlayer 10 is further flattened by etching and the like, and a part of the interlayer 5 is exposed from the surface of the second underlayer 10.

In FIG. 10A, the second underlayer 10 has a protrusion on the surface thereof in a pattern corresponding to the pattern of the interlayer 5 existing under the second underlayer 10. Note that holes are formed in the interlayer 5.

In the mode shown in FIG. 10A, the surface of the second underlayer 10 is not processed different from the underlayer 4 and the interlayer 5. Accordingly, the surface of the second underlayer 10 has a high flatness, and further, the magnetic recording layer 7 having a high flatness can be formed on the second underlayer 10.

In the mode shown in FIG. 10B, the protrusion at the interlayer 5 has a height lower than that in the third embodiment shown in FIG. 8. Therefore, when the magnetic recording layer 7 is formed on the second underlayer 10, the height of the protrusion on the surface of the magnetic recording layer 7 can be reduced.

Next, a method of manufacturing a magnetic recording medium 1 will be explained. First, a method of manufacturing the magnetic recording medium 1 shown in FIG. 6 will be explained.

First, the underlayer 4 is formed on the substrate. Thereafter, a resist layer is formed on the underlayer 4. Patterns are transferred to the resist layer with a stamper on which the patterns are previously formed by a nanoimprint method. At the time, since a protruding and recessed shape and a flat shape are formed on the stamper, a shape corresponding to the first region 24 and a shape corresponding to the second region 25 are transferred to the resist layer as the patterns. The patterns are formed on the underlayer 4 by etching the underlayer 4 using the resist layer as a mask.

Next, the magnetic recording layer 7 is formed on the underlayer 4 on which the patterns are formed. The magnetic recording layer 7 is formed by performing sputtering using a mixture of a magnetic material and a nonmagnetic material as a target. The underlayer 4 is formed with a region whose surface includes a protruding and recessed shape and a flat region. Accordingly, patterns are formed by the first magnetic particles 26, the second magnetic particles 27 and the nonmagnetic matrix 28, depending on the patterns of the surface.

The magnetic recording medium 1 according to the first embodiment shown in FIG. 6 can be formed by the manufacturing method.

An example of a more specific manufacturing method will be shown below.

First, a soft magnetic underlayer is formed on the substrate by sputtering. The soft magnetic underlayer preferably has a film thickness of about several tens of nanometers to about several hundreds of micron meters.

Next, the underlayer 4 is formed on the soft magnetic underlayer by sputtering. The underlayer 4 preferably has a thickness of several tens of nanometers to about several hundreds of nanometers. Increasing the distance between the magnetic recording layer 7 to be formed later and the soft magnetic underlayer deteriorates write characteristics. Therefore, the underlayer 4 preferably has a thickness of 50 nm or less in particular.

Next, a resist layer is formed on the underlayer 4.

Patterns are transferred to the thus formed resist layer by a nanoimprint method. The patterns of a stamper used in the nanoimprint method can be formed by an electron beam drawing. Highly dense patterns of 10 nm or less can be formed using calixarene and HSQ as an electron beam resist. The thickness of the resist layer is set in consideration of the depth of recesses to be formed and the etching selectivity between resist layer material and an underlayer material at an etching step which is performed subsequently. A thermal nanoimprint, a room temperature nanoimprint, a UV nanoimprint, and the like can be used as the nanoimprint method.

Next, the patterns of the resist layer are transferred to the underlayer 4 by dry etching. Thereafter, an etching mask is stripped off. Note that the etching may be continued until the etching mask is removed by adjusting the thickness of the etching mask. With the operation, a stripping step of the etching mask can be omitted.

Note that a material for etching the underlayer 4 may be configured as a multilayer structure. For example, after a carbon film and a Si film are sequentially formed on the underlayer 4, the resist layer may be formed on the films. In the case, the Si film is dry etched usng a resist layer on which the patterns are nanoimprinted as a mask. Thereafter, the carbon film is further dry etched using the Si film as a mask so that an etching mask to the underlayer 4 can be formed. In the case, a concavo-convex pattern having a high aspect rate can be formed to the carbon film using dry etching performed by an oxygen gas when the carbon film is etched. Therefore, since the etching mask remains for a long time when the underlayer 4 is etched, protrusions having a high aspect rate can be formed.

As a modification of the processing method of the underlayer 4, it is also possible to configure the underlayer 4 as a laminated structure. That is, first, after a concavo-convex pattern is formed to the underlayer 4 by the above method, the second underlayer 10 can be formed thereon. In this case, since the underlayer 4 the surface of which is damaged by the etching process is covered with the second underlayer 10, a surface having a high flatness can be obtained.

As described above, a fine concavo-convex pattern according to the data region 3 and the servo region 2 can be formed on the surface of the underlayer 4. Note that since no concavo-convex pattern is formed on the surface of the underlayer 4 corresponding to the second region 25 of the servo region 2, the roughness of the surface is approximately the same as the roughness of the surface after the surface is formed by sputtering.

Next, the magnetic recording layer 7 is formed by sputtering a magnetic material and a nonmagnetic material. At the time, the magnetic material is epitaxially grown from the protruding sections of the underlayer 4. In contrast, the nonmagnetic material is selectively grown in the recesses of the underlayer 4.

As described above, a granular structure corresponding to the patterns formed by the nanoimprint is formed to the magnetic recording layer 7.

In contrast, in the flat region of the underlayer 4 corresponding to the second region 25, since no seed structure exists, a granular structure having large crystal particles is formed.

Next, a method of manufacturing the magnetic recording medium 1 shown in FIG. 7 will be explained.

Since a step of forming the underlayer 4 on the substrate is the same as the step of forming the underlayer 4 of the magnetic recording medium 1 shown in FIG. 6, an explanation of the step is omitted.

The interlayer 5 including any of oxides, nitrides, or organic substances is formed on the underlayer 4. A resist layer is formed on the interlayer 5, and patterns are transferred to the resist layer by nanoimprinting a stamper. At the time, the patterns formed on the resist layer include a plurality of holes and a flat region. The holes correspond to the first region 24, and the flat region corresponds to the second region 25.

The interlayer 5 is etched using the patterned resist layer as a mask, and the patterns are transferred to the interlayer 5. Thereafter, the magnetic recording layer 7 is formed on the interlayer 5 on which the patterns are formed. By the operation, the patterns are formed by the first magnetic particles 26, the nonmagnetic matrix 28, and the like according to the patterns of the interlayer 5. The magnetic recording medium 1 according to the second embodiment shown in FIG. 7 is formed by the method.

An example of a more specific manufacturing method will be shown below.

The soft magnetic underlayer can be formed like the first embodiment. The underlayer 4 is formed on the thus formed soft magnetic underlayer. Further, the interlayer 5 is formed by forming any of oxides, nitrides, and organic substances on the underlayer 4. When the oxides or the nitrides are used, the interlayer 5 can be formed by RF sputtering. When the organic substances are used, the interlayer 5 can be formed by spin-coating a solution in which the organic substances are dissolved in a solvent. Further, when the interlayer 5 is a carbon film and the like, the interlayer 5 can be formed by sputtering.

Next, a resist layer is formed on the interlayer 5.

Next, a stamper is nanoimprinted to the resist layer and patterns corresponding to the data region 3 and the servo region 2 are formed. The interlayer 5 is processed by dry etching using the resist layer as a mask. Thereafter, the remaining resist layer is stripped off when necessary. In the region corresponding to the first region 24, a plurality of holes are formed to the interlayer 5 passing through up to the underlayer 4 by processing the interlayer 5. In contrast, in the region corresponding to the second region 25 of the interlayer 5, the interlayer 5 remains in a flat state without being subjected to any processing (FIG. 7). The magnetic recording layer 7 is formed on the interlayer 5 to which the patterns are formed as described above.

Note that, as a modification of the step for forming the underlayer 4 and the interlayer 5, an underlayer may be further laminated on the underlayer 4 and the interlayer 5. That is, after protruding and recessed patterns are formed to the interlayer 5, a second underlayer 10 can be laminated thereon (FIG. 10A). In this case, since the underlayer 4 and the interlayer 5 whose surfaces are damaged by an etching process are covered with the second underlayer 10, surfaces having a high flatness can be obtained.

A magnetic material and a nonmagnetic material are formed on the second underlayer 10 to which the patterns are formed by sputtering, thereby forming the magnetic recording layer 7. With the operation, in the region corresponding to the first region 24, the magnetic material is epitaxially grown selectively in the section in which the second underlayer 10 is formed on the interlayer 5. At the time, in the second underlayer 10 in which no interlayer 5 is formed, the nonmagnetic material is selectively grown and surrounds the magnetic material.

In contrast, in the region corresponding to the second region 25, since no interlayer 5 is formed, the surface of the second underlayer 10 is flat. Accordingly, since no protrusion acting as a start point of growth exists, the magnetic material is grown from sparse positions, and thus a granular structure having large crystal particles is formed.

Next, a method of manufacturing the magnetic recording medium 1 shown in FIG. 8 will be explained.

Since a step of forming the underlayer 4 on the substrate is the same as the step of forming the underlayer 4 of the magnetic recording medium 1 shown in FIG. 6, an explanation of the step is omitted.

The magnetic recording medium 1 shown in FIG. 8 is different from the magnetic recording medium 1 shown in FIG. 7 in that no interlayer 5 is formed on the underlayer 4 in the second region 25.

The difference is caused by a difference of shape of an etching mask when the interlayer 5 is processed. That is, the shape of the etching mask protrudes in the region corresponding to the first region 24 after a nanoimprint is performed, and the height of the protrusions of the etching mask becomes higher than the height of the etching mask in the region corresponding to the second region 25. When etching is performed to such the etching mask, in the second region 25 in which the etching mask is low, since the interlayer 5 can be removed by the etching, the underlayer 4 is exposed. In the thus processed interlayer 5, a plurality of holes are formed to the interlayer 5 passing through up to the underlayer 4 in the region corresponding to the first region 24. A magnetic material is epitaxially grown selectively in the holes from which the underlayer 4 is exposed. At the time, in the section in which no hole is formed to the interlayer 5, a nonmagnetic material is epitaxially grown selectively so as to surround the magnetic material.

In contrast, in the region corresponding to the second region 25, as shown in FIG. 8, a magnetic material having larger particle size is epitaxially grown at random, and a nonmagnetic material is epitaxially grown around the magnetic material.

Note that, as a modification of processing of the underlayer 4 and the interlayer 5 in the third embodiment, the second underlayer 10 may be processed after the second underlayer 10 is further laminated on the underlayer 4 and the interlayer 5. That is, after patterns are formed to the interlayer 5, the second underlayer 10 is laminated thereon, and further the surface of the second underlayer 10 is flattened by etching and the like (FIG. 10B). At the time, a part of the interlayer 5 is exposed from the surface of the second underlayer 10. In this case, the height of the interlayer 5 from the surface of the second underlayer 10 can be made small. Therefore, when the magnetic recording layer 7 is laminated on the interlayer 5, the protrusions on the surface of the magnetic recording layer 7 can be made small.

Next, materials for manufacturing the magnetic recording medium 1 will be explained.

Nonmagnetic metal substrates such as a glass substrate, a plastic substrate, a ceramics substrate, and an aluminum, a Si substrate, and the like can be used as the substrate.

CoZrNb, CoTaZr, FeCoB, FeCoN, FeTaC, FeTaN, FeNi, FeSi, NiFeNb, Co, COB, or FeAlSi, and the like, which have a high saturation magnetic flux density and good soft magnetic characteristics, are used as the soft magnetic underlayer. The soft magnetic underlayer may be a single layer or may be a laminated layer. When the soft magnetic underlayer is the laminated layer, an arbitrary nonmagnetic intermediate layer can be inserted between the respective soft magnetic layers.

The underlayer 4 may be a single layer structure or may be a laminated layer structure, and when CoPt alloy is used as the magnetic recording layer 7, a continuous film of Ru or Ru alloy is preferably used as the underlayer 4. After a metal film other than Ru is formed on the soft magnetic underlayer as the underlayer 4, the continuous film of Ru or Ru alloy may be formed as the second underlayer 10. Further, both the underlayer 4 and the second underlayer 10 may be formed as the continuous film of Ru or Ru alloy in two steps.

The magnetic recording layer 7 may be configured as a vertical magnetic recording layer. A mixture of a magnetic material and a nonmagnetic material may be used to form the magnetic recording layer 7. Co alloys such as CoPt, CoCr, CoCrPt, and CoCrTa can be used as the magnetic material. Oxides such as $SiO_2$, $Al_2O_3$, $Ta_2O_5$, and $TiO_2$ or nitrides such as $Si_3N_4$, AlN, and TaN can be used as the nonmagnetic material.

A material, which has a high affinity with the nonmagnetic material included in the magnetic recording layer 7, is preferable as the material of the interlayer 5. For example, oxides such as $SiO_2$, $Al_2O_3$, $Ta_2O_5$, and $TiO_2$, nitrides such as $Si_3N_4$, AlN, and TaN or organic substances such as a photoresist, and organosilicate can be used.

EXAMPLES

Example 1

A magnetic recording medium 1 was manufactured. A magnetic recording layer 7 was formed on a processed underlayer 4.

A 120-nm-thick soft magnetic underlayer of CoZrNb was formed by DC sputtering on a 2.5-inch glass substrate for HDD at a degree of vacuum of $1 \times 10^{-5}$ Pa in a 0.7-Pa Ar gas at a power of 500 W. The underlayer 4 was formed by forming Ru to a 20 nm thickness on the soft magnetic underlayer at a power of 500 W. SOG (spin on glass) was applied on the underlayer 4 to a film thickness of 10 nm as a resist layer.

Next, a stamper having patterns was imprinted to the resist layer at a press pressure of 30 tons. The patterns of the stamper used a structure which was configured such that dots were disposed at the positions corresponding to first magnetic particles 26 of a servo region 2 in a triangle grid state at 14-nm pitches. Next, the Ru was etched by 5 nm by performing argon ion milling under conditions of an acceleration voltage of 400V and an ion current of 40 mA. After the etching under such conditions, no SOG remained on the surface of the Ru.

A 15-nm-thick vertical magnetic recording layer whose magnetization faced a laminate direction was formed on the etched underlayer 4 as the magnetic recording layer 7 using a CoCrPt-6 mol % $SiO_2$ composite target. Next, after a 7-nm thick carbon protective film was formed, a 1.5-nm-thick perfluoroether lubrication film was formed by a dip method, and the magnetic recording medium 1 was obtained.

After a 15-kOe magnetic field was applied to the obtained magnetic recording medium 1 and magnetized, an 8-kOe inverted magnetic field was applied thereto. When a reproduction output of the servo region 2 of the medium was measured using a spin stand, a good signal could be obtained.

Comparative Example 1

A magnetic recording medium 1 was manufactured similarly to the embodiment 1 except that a stamper had different patterns. The stamper used in the comparative example had no dot structure at the positions corresponding to first magnetic particles 26 of a servo region 2 and had a structure in which a first region 24 was concave in its entirety in place of the dot structure. With the configuration, the patterns of an underlayer 4, in which the first region 24 was convex in its entirety to a second region 25, could be obtained.

After a 15-kOe magnetic field was applied to the magnetic recording medium 1 formed using the underlayer 4 and magnetized, an 8-kOe magnetic field was applied thereto. When a reproduction output of the servo region 2 of the medium was measured using a spin stand, a clear signal could not be obtained. It is conceived that the result shows that since the particle size of granules of the servo region 2 was formed uniformly, no difference appeared between coercive forces.

Example 2

A magnetic recording medium 1 was manufactured. After an interlayer 5 was formed and processed, a magnetic recording layer 7 was formed thereon.

The same steps as in the embodiment 1 were performed until an underlayer 4 was formed using Ru. Thereafter, a 10-nm-thick $SiO_2$ film was formed on the underlayer 4 by RF sputtering. SOG was applied on the $SiO_2$ film to a film thickness of 10 nm as a resist layer.

A stamper was imprinted to the resist layer. The same patterns as the example 1 were used as the patterns of the stamper. Next, the $SiO_2$ film was etched 12 nm by argon ion milling using the resist layer as a mask.

After the interlayer 5 including $SiO_2$ was processed, a 15-nm-vertical magnetic recording layer was formed as the magnetic recording layer 7 using a CoCrPt-8 mol % $SiO_2$ composite target. Next, after a 7-nm thick carbon protective film was formed, a 1.5-nm-thick perfluoroether lubrication film was formed by a dip method, and the magnetic recording medium 1 was obtained.

After a 15-kOe magnetic field was applied to the obtained magnetic recording medium 1 and magnetized, an 8-kOe inverted magnetic field was applied thereto. When a reproduction output of the servo region 2 of the medium was measured using a spin stand, a good signal could be obtained.

Example 3

A magnetic recording medium 1 was manufactured. After an underlayer 4 was processed, an underlayer 4 was further laminated thereon, and a magnetic recording layer 7 was further formed.

The underlayer 4 was formed similarly to the embodiment 1 and processed making use of a nanoimprint method. A 5-nm-thick Ru film was formed on the underlayer 4 as a second underlayer 10. A 15-nm-thick vertical magnetic recording layer was formed on the second underlayer 10 as the magnetic recording layer 7 using a CoCrPt-8 mol % $SiO_2$ composite target.

When the thus obtained magnetic recording medium 1 was measured by X-ray diffraction, the half-value width of the peak rocking curve of CoCrPt (002) of the magnetic recording medium 1 of the example 3 was improved to 3.5° although that of the magnetic recording medium 1 of the embodiment 1 was 5.0°.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording medium, comprising:
an underlayer;
an interlayer formed on the underlayer, wherein the interlayer comprises first and second regions adjacent to each other, the first region has holes that pass from a surface of the underlayer to a surface of the interlayer, and the second region has a flat surface;
first magnetic particles formed on the first region, wherein the first magnetic particles comprise easy axes of magnetization;
a first nonmagnetic matrix formed on the first region and surrounding the first magnetic particles; and
a non-oriented part formed on the second region, wherein the non-oriented part comprises a nonmagnetic material and a magnetic material, and the magnetic material has an easy axis of magnetization different from easy axes of magnetization of the first magnetic particles.

2. The magnetic recording medium according to claim 1, wherein the magnetic material comprises dispersed magnetic particles in the nonmagnetic material, and sizes of the first magnetic particles are smaller than sizes of the dispersed magnetic particles.

3. The magnetic recording medium according to claim 1, wherein the underlayer comprises ruthenium (Ru) or Ru alloy.

4. The magnetic recording medium according to claim 1, wherein the interlayer comprises oxide(s), nitride(s) or organic substance(s).

5. The magnetic recording medium according to claim 4, wherein the interlayer comprises $SiO_2$, $Al_2O_3$, $Ta_2O_5$, $TiO_2$, $Si_3N_4$, AlN, TaN, photoresist, or organosilicate.

* * * * *